Nov. 4, 1969     W. GRUMM     3,476,652
HORIZONTAL COKE OVEN BATTERIES
Filed June 20, 1967     3 Sheets-Sheet 1
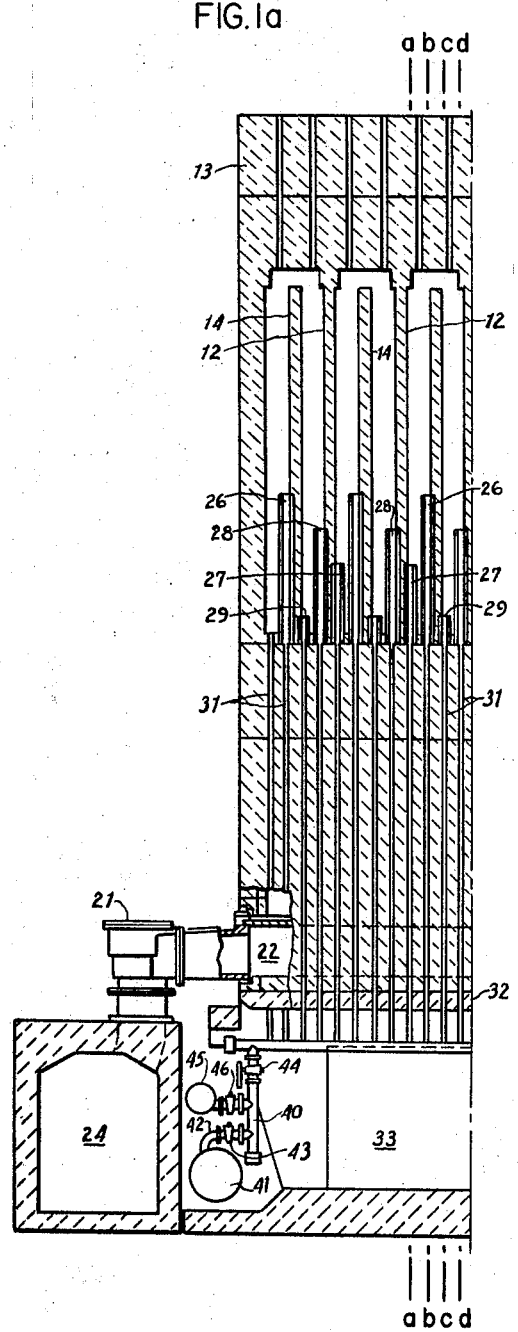
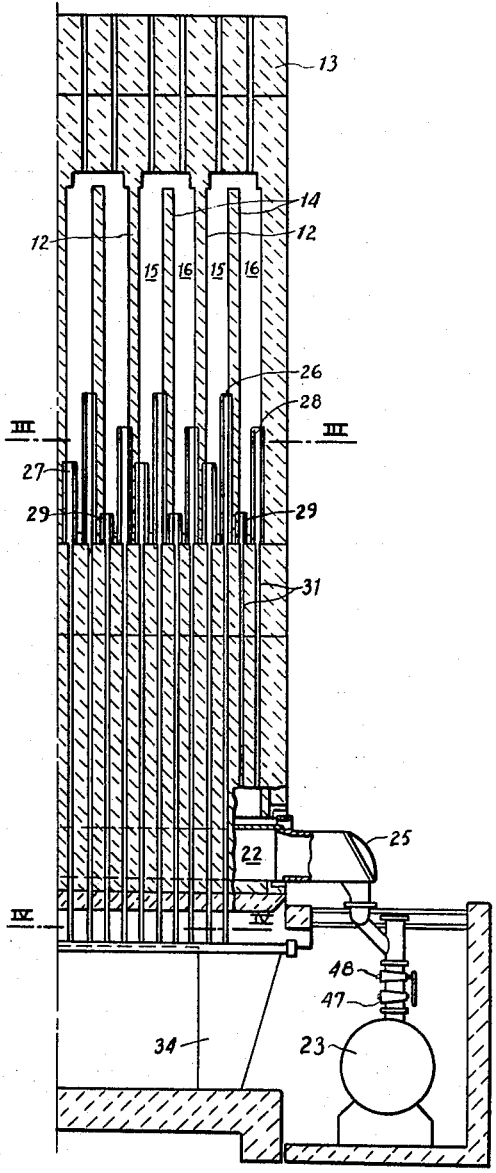
INVENTOR.
WALTER GRUMM
BY

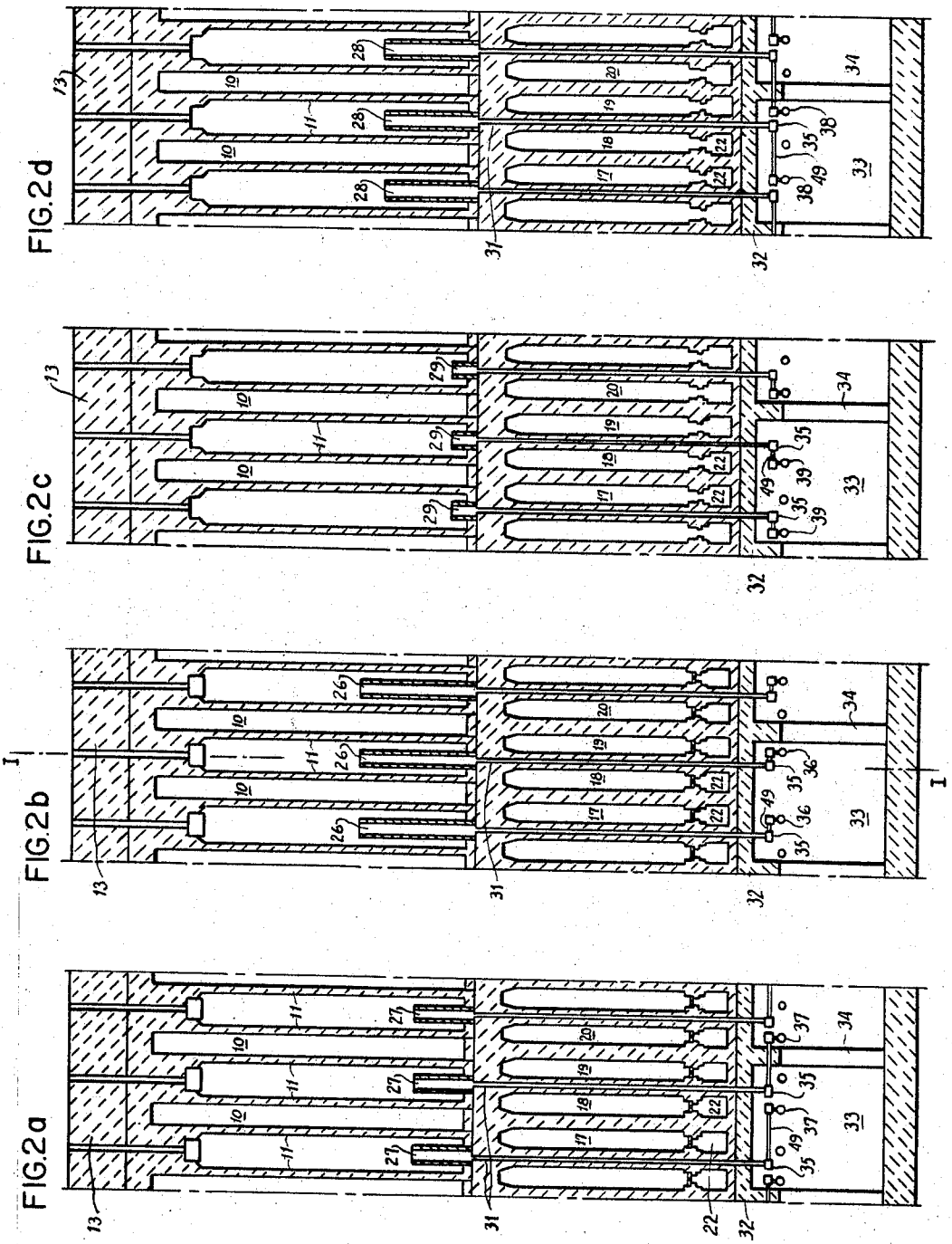

Nov. 4, 1969 W. GRUMM 3,476,652
HORIZONTAL COKE OVEN BATTERIES
Filed June 20, 1967 3 Sheets-Sheet 3

INVENTOR.
WALTER GRUMM

BY H. Edward Mestern

United States Patent Office 3,476,652
Patented Nov. 4, 1969

3,476,652
HORIZONTAL COKE OVEN BATTERIES
Walter Grumm, Niederelfringhausen 15,
uber Hattingen (Ruhr), Germany
Filed June 20, 1967, Ser. No. 647,442
Int. Cl. C10b 21/22, 21/06, 3/00
U.S. Cl. 202—142                                5 Claims

ABSTRACT OF THE DISCLOSURE

A vertical coke oven battery wherein rich fuel gas and lean gas can be used for heating. Each flue has two burners of different heights, and each pair of flues has burners which again differ in height. The conduits and riser pipes are so connected to each other that lean gas can be supplied into the higher burners in order to introduce more heat, at uniform temperatures, into the upper parts of the flues.

---

Coke ovens in battery formation, whose chambers are divided by heating walls into horizontal flues and wherein regenerators are disposed below the chambers for preheating of air alone or in mixture with a lean gas and also to receive waste heat from spent gases, frequently are constructed in heights exceeding 15 feet. When an interconnected operation is carried out with compound ovens of this kind of such a nature that, besides a regeneratively preheated lean gas, an unpreheated rich fuel gas also can be used for heating, it is customary to provide burners for the introduction of the latter into the flues which protrude into these flues at different heights.

The invention is concerned with such vertical coke oven batteries having cellaring below the regenerators wherein the distributing conduits for the rich fuel gas are housed. The rich fuel gas is fed into each individual burner through substantially vertical conduits which rise in the walls separating the regenerator spaces. In ovens of this kind horizontal metal distributing pipes usually can be used which are housed in the cellaring, and special vertical riser pipes are provided which are connected solely to the conduits leading to the higher burners, while also providing another group of horizontal distributor pipes connected solely to the conduits for the lower burners.

Ovens of this kind are known per se. Upon heating with rich fuel gas, it is possible to attain uniform heating of the fuel contents of high chambers, e.g., those of more than 15 feet, by grading the quantities of gas introduced into the higher and lower burners accordingly.

However, when an oven of the kind described is to be heated with lean gas, these measures of grading the fuel are not necessarily available. It is an object of the invention to construct a regenerative, vertical-flued compound oven having burners of different heights for rich fuel gas in such a manner as to enable additional heating of the upper parts of the oven chambers with lean gas.

Another object of the invention is to influence the combustion of the lean gas and the rich fuel gas by a particular construction of the burners in such a manner that more rapid mixing of the gas introduced into the flue with the preheated combustion air rising therein from the sole occurs.

It is still another object of the invention to shift the heat effect of the gases within the flues in elevational direction upon lean gas heating and to adapt it to the prevailing coking conditions of the coal used, beside regulating the supply introduced from the horizontal distributor pipes into the vertical risers in a simple manner.

One feature salient for carrying out the invention is the provision of a connector to the group of distributor pipes assigned to the higher burners which can be shut off and reversed. This connector leads to a lean gas main and can, moreover, contain a control device. The groups of distributor pipes for the higher and the lower burners are in horizontal position in the cellaring, as previously stated.

Through the installation of such a connector, heating by a regeneratively preheated lean gas can be augmented by additional lean gas heating which flows through the rich fuel gas distributing system and is conducted to the higher burners in each flue. This effects stronger heating of the upper part of the flue. By adjusting the quantity of the lean gas so supplied, the heat at given height can be regulated. This is carried out by means of control devices which will be described in detail below.

The invention now will be more fully explained with reference to the accompanying drawings. However, it should be understood that these are given merely by way of illustration, and not of limitation, and that it is intended to cover all modifications and variations which do not depart from the spirit and the scope of the invention as hereinafter claimed.

In the drawings:

FIGS. 1a and 1b are elevational sections, of the coking and machine sides, respectively, through a heating wall of the coke oven, taken along lines I—I of FIG. 2b, showing only the portions near the oven ports;

FIGS. 2a, 2b, 2c and 2d are elevations in longitudinal direction along lines a—a, b—b, c—c, and d—d, respectively, of FIG. 1;

Figure 3:
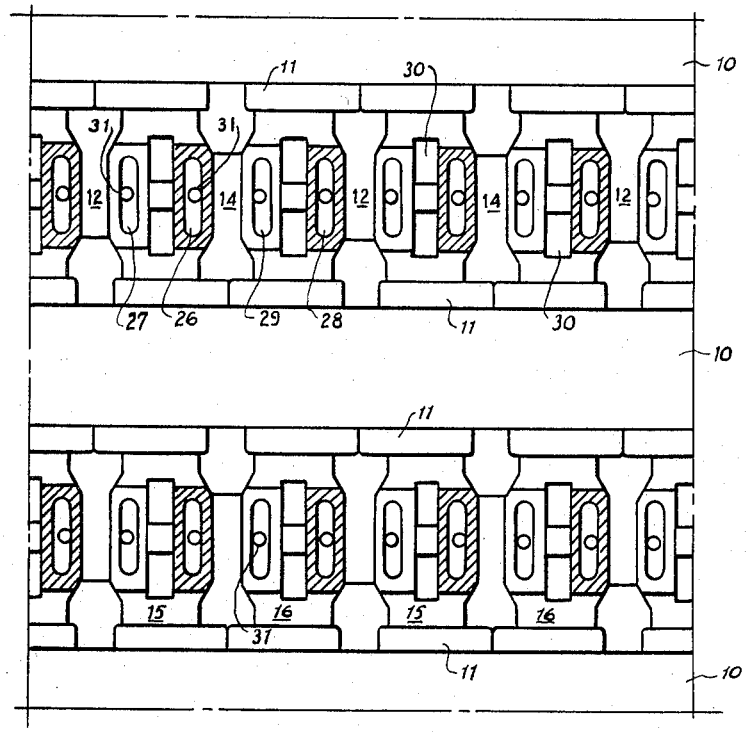
FIG. 3 is a horizontal section through the oven, taken along lines III—III of FIG. 1.
Figure 4:
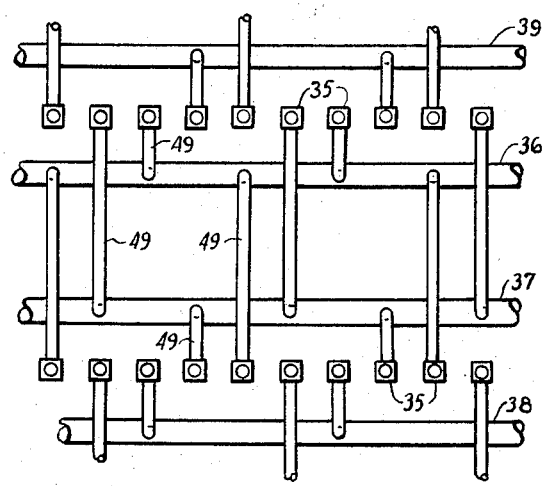
FIG. 4 is a horizontal section, taken along lines IV—IV of FIG. 1.

Referring now to these drawings, the horizontal oven chambers 10 are faced on both sides by vertical passages 11. These, together with partitions 12 and 14, limit the flues. Partitions 12 continue to the ceiling while partitions 14 do not, but connect a pair of flues 15 and 16. In the regenerative sequence, the flames burn up in one flue and pass off in the other.

The oven shown is a regenerative vertical-flued compound oven, i.e., it is possible to heat with a regeneratively preheated gas as well as with rich fuel gas which had not been conducted through regenerators. In the former instance, one of a pair of regenerators alternatively serves for preheating of air, the other simultaneously for the preheating of lean gas. Upon heating with rich fuel gas, both regenerators of one pair serve for the preheating of air within one regenerative half period.

Thus, four different kinds of regenerators are present in such an oven, shown in FIGS. 2a–2d as 17, 18, 19 and 20, respectively. Upon heating with lean gas, regenerator 17 preheats the lean gas, regenerator 18 preheats the air, and regenerators 19 and 20 absorb the waste heat of the burned gases. In the regenerative half period following, regenerator 19 preheats the lean gas, regenerator 20 preheats the air, and the burned gases flow off through regenerators 17 and 18.

When rich fuel gas is used, the regenerator otherwise preheating the lean gas also preheats air.

Change-over valves 21 are connected to the regenerator sole channels 22 which are disposed below the regenerators. Channels 22 can be connected to smokestack duct 24 by means of valves 21. The duct is disposed on the coke side of the oven, i.e., the side toward which the chambers are emptied. Air flaps 25 are in open position in the regenerative half period in which air is to be introduced into the sole channels. The lean gas main is shown as 23; 47 are shut-off valves and 48 are change-over valves for lean gas. 23 and 25 are disposed on the machine side, i.e., on the side on which the coke pusher operates which empties the chambers by means of a plunger traversing the chambers.

The regenerators 17, 18, 19 and 20 are connected to flues 15 and 16 by ducts 30, which rise obliquely.

In each flue two burners are provided for rich fuel gas heating one of which is in higher position than the other. In flue 15, the higher burner is 26, the lower is shown as 27. In each flue 16, there is a higher burner 28 and a lower burner 29. A feature of the burners is their considerably larger cross section relative to the riser conduits 31 in the regenerator dividing walls. The cross section is enlarged particularly at right angles to the axis of chamber 10.

The oven shown is of the underburner type. Below the concrete plate 32 supporting the oven, there is a cellar space 33. The oven is further supported by columns 34. The horizontal rich fuel gas distributor pipes 36, 37, 38 and 39 traverse the cellar space 33. Each of the rich fuel gas conduits 31, rising vertically in the regenarator walls, is connected to one of the pipes 36, 37, 38 and 39 by way of a nipple 35 which is disposed immediately below conduit 31 and by way of an angularly bent tube 49. The connections are made so that pipes 36 and 38 only feed the higher burners 26 and 28, and pipes 37 and 39 only supply the lower burners 27 and 29. The pipes are so connected to the burners that a given rich fuel distributor pipe, connected to the first, third, fifth flue, etc., of one abutting wall, simultaneously is in connection with the second, fourth, sixth flue, etc., of the opposite abutting wall. This interlaced kind of connection also applies to the joining of the regenerators 17, 18, 19 and 20 to the flues by way of ducts 30.

All rich fuel gas distributor pipes, 36, 37, 38 and 39 are connected to the rich fuel gas main 41 by vertical riser pipes 40. Main 41 is disposed in cellar space 33 and extends the entire length of the battery. Shut-off valves 43 for the rich fuel gas are installed in the bent tubes 42 which connect risers 40 to main 41. In the upper part of risers 40, change-over stopcocks 44 are provided, operating according to the regenerative sequences.

Nozzles or other control devices, disposed in the nipples 35, serve to exactly meter the quantity of rich fuel gas supplied to each burner.

It is a salient feature of the invention that those risers 40 are connected to a lean gas distributor pipe 45 above rich fuel main 41 by way of shut-off valves 46 which lead to rich fuel gas distributor pipes 36 and 38, i.e., to those which feed the higher burners 26 and 28.

When the oven is heated with lean gas, heated in regenerators 18 and 20 and conducted to the flues, as described above, additional lean gas heating can be carried out by way of distributor pipe 45. This gas is introduced into burners 28 and 26 thus applying heat to the upper parts of the flues 15 and 16 and thereby also to the fuel in the upper parts of chambers 10.

The shut-off valves 43 are open when rich fuel gas is used, and valves 46 are closed. When using lean gas, the positions of these valves are reversed.

The heating system according to the invention also is applicable to an oven wherein the shut-off and change-over valves are disposed in another manner. It is feasible to connect the additional lean gas conduit 45 to all riser pipes 40 while providing three-way stopcocks at the points of connection. These stopcocks are installed so that they supply rich fuel gas in one position and shut off the lean gas, shut off rich fuel gas and supply lean gas in the second position, and shut off all gases in the third position. When additional lean gas is to be supplied exclusively through the upper burners, the stopcocks assigned to the riser pipes leading to the lower burners must be in the third position.

Figure 5A:
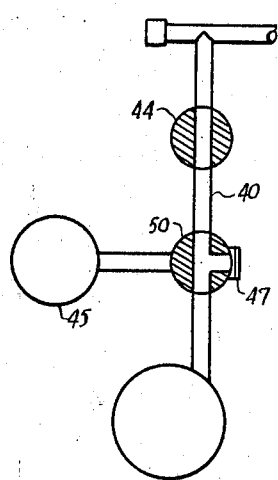
FIGS. 5a to 5c are schematic showing positions of a three-way stopcock.
Figure 5B:
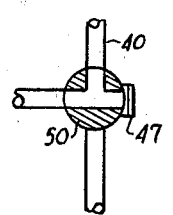
Figure 5C:
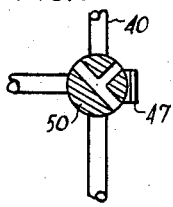

FIGS. 5a–5c show a three-way stopcock in these three positions. It is connected at the upper part to the riser pipe 40 leading to valve 44, on the side to the additional lean gas conduit 45 and, at its lower part, to rich fuel gas main 41. 47 is a gastight closure for the opening required for cleaning.

In FIG. 5a, rich fuel gas is supplied, in FIG. 5b lean gas. The position shown in FIG. 5c shuts off both gases. When heating with rich fuel gas, all stopcocks are in the position shown in FIG. 5a. Upon heating with lean gas with additional lean gas heating through the upper burners 26 and 28, the stopcocks on the riser pipes 40 assigned to distributor pipes 36 and 38, the position according to FIG. 5b applies, and those leading to distributor pipes 27 and 29 must be in the position according to FIG. 5c.

I claim as my invention:

1. In a horizontal coke oven battery having pairs of flues, regenerators therebelow, and a cellar space below said regenerators, at least one gas main for rich fuel gas, said cellar space housing gas supply lines in horizontal position, in combination, burners disposed in said flues, risers defined in the walls between the regenerators, said supply lines being connected to said risers which feed gas to said burners, each flue having at least two burners of different height, the higher burners in each flue together constituting a first group, the lower burners in each flue together constituting a second group; each group having a horizontal gas supply in said cellar space connected to said gas main; each burner throughout having a larger cross section than its riser taken at right angles relative to the axis of the oven chamber.

2. The battery as defined in claim 1, wherein the height of the higher burners and that of the lower burners is different from the respective heights of the upper and lower burners in the next adjoining flue.

3. The battery as defined in claim 1, wherein the burners also are elongated parallel relative to the said axis.

4. In a horizontal coke oven battery, as claimed in claim 1, a lean gas main line, and supply lines connected thereto, and a reversible shut-off means connecting said first group also to said lean supply lines.

5. The battery as defined in claim 4, wherein said reversible shut-off means is a valve supplying additional lean gas through the rich fuel gas supply to said first gas group, thus effecting increased and uniform heat to the upper part of said flues.

References Cited
UNITED STATES PATENTS

| | | | |
|---|---|---|---|
| 3,345,051 | 10/1967 | Van Ackeren | 202—139 |
| 1,770,285 | 7/1930 | Otto | 202—135 |
| 1,973,015 | 9/1934 | Pavitt | 202—143 |
| 2,623,846 | 12/1952 | Robert | 202—142 |
| 2,746,913 | 5/1956 | Schurhoff | 202—142 |
| 3,042,590 | 7/1962 | Van Ackeren et al. | 202—144 |
| 3,192,129 | 6/1965 | Becker | 202—135 |
| 3,211,632 | 10/1965 | Otto | 202—135 |
| 3,304,240 | 2/1967 | Van Ackeren | 202—135 |
| 3,382,156 | 5/1968 | Van Ackeren | 202—142 |

WILBUR L. BASCOMB, Jr., Primary Examiner

U.S. Cl. X.R.

202—139